(12) United States Patent
Han (10) Patent No.: US 8,807,446 B2
(45) Date of Patent: Aug. 19, 2014

(54) HEATING DEVICE WITH CATHODE OXYGEN DEPLETION FUNCTION FOR FUEL CELL VEHICLE

(75) Inventor: Su Dong Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1405 days.

(21) Appl. No.: 12/156,369

(22) Filed: May 30, 2008

(65) Prior Publication Data

US 2009/0140066 A1    Jun. 4, 2009

(30) Foreign Application Priority Data

Dec. 4, 2007  (KR) .................. 10-2007-0124727

(51) Int. Cl.
*B60K 11/04* (2006.01)
*B60L 11/04* (2006.01)
*B60L 11/18* (2006.01)

(52) U.S. Cl.
USPC ............ 237/12.3 R; 237/12.3 B; 429/52; 219/202; 219/200; 219/201; 392/451; 392/497; 165/146; 165/147

(58) Field of Classification Search
CPC .. B60H 1/00278; B60H 1/00314; B60K 6/32; B60K 11/02; F24H 2240/10; H01M 8/0267; H01M 8/0297; H01M 8/04723
USPC .......... 237/12.3 R, 12.3 B; 429/52; 219/200, 219/201, 202, 208, 437, 523; 392/451, 497; 165/146, 147, 179
IPC ..................................... B60K 11/04; B60L 1/18
See application file for complete search history.

(56) References Cited

U.S. PATENT DOCUMENTS

| 512,797 | A | * | 1/1894 | Bowen | 392/373 |
| 1,005,441 | A | * | 10/1911 | Lovekin | 165/143 |
| 1,432,518 | A | * | 10/1922 | Armstrong | 123/41.26 |

(Continued)

FOREIGN PATENT DOCUMENTS

| JP | 03208214 A | * | 9/1991 | H01B 19/00 |
| JP | 2002127734 A | * | 5/2002 | B60H 1/03 |

(Continued)

OTHER PUBLICATIONS

"MagicAire VWHW Coils 2003.pdf", United Electric Co, LP, Apr. 2003.*

*Primary Examiner* — Kang Hu
*Assistant Examiner* — Daniel E Namay
(74) *Attorney, Agent, or Firm* — Edwards Wildman Palmer LLP; Peter F. Corless (57) ABSTRACT

The present invention provides a heating device with cathode oxygen depletion (COD) function for a fuel cell vehicle, in which an existing COD and a heating device for improving cold startability of the fuel cell vehicle are integrated. For this purpose, the present invention provides a heating device with COD function for a fuel cell vehicle, the heating device including: a housing having an inlet and an outlet formed on both ends thereof; a start-up heater and a shut-down heater provided in parallel on one side of the housing in a direction perpendicular to a coolant flow direction; and a plurality of heaters for heating coolant provided in parallel on the other side of the housing in a direction perpendicular to the coolant flow direction, wherein cross sections in the coolant flow direction of each of the respective heaters change periodically along the longitudinal direction of the heater so as to cause a flow disturbance.

4 Claims, 7 Drawing Sheets

(56) References Cited

U.S. PATENT DOCUMENTS

| | | | | |
|---|---|---|---|---|
| 1,631,485 A | * | 6/1927 | Hudson | 392/453 |
| 1,931,247 A | * | 10/1933 | Brown | 165/129 |
| 2,200,397 A | * | 5/1940 | Monson | 165/277 |
| 2,270,824 A | * | 1/1942 | Meyerhoefer | 237/2 A |
| 2,466,684 A | * | 4/1949 | Case | 165/148 |
| 2,727,979 A | * | 12/1955 | Altosaar | 392/448 |
| 3,099,315 A | * | 7/1963 | Loehr | 165/144 |
| 3,112,793 A | * | 12/1963 | Sass | 165/175 |
| 3,300,619 A | * | 1/1967 | Nilssen | 392/307 |
| 3,519,795 A | * | 7/1970 | Kinney | 392/448 |
| 3,641,312 A | * | 2/1972 | Ammerman et al. | 219/532 |
| 3,651,304 A | * | 3/1972 | Fedor | 219/200 |
| 4,559,994 A | * | 12/1985 | Waldmann et al. | 165/41 |
| 4,720,624 A | * | 1/1988 | Kikuchi et al. | 219/553 |
| 5,203,404 A | * | 4/1993 | Chiang et al. | 165/133 |
| 5,397,179 A | * | 3/1995 | Berlin et al. | 366/337 |
| 5,573,062 A | * | 11/1996 | Ooba et al. | 165/177 |
| 5,583,960 A | * | 12/1996 | Reznik | 392/321 |
| 5,584,340 A | * | 12/1996 | Derosier | 165/82 |
| 5,632,329 A | * | 5/1997 | Fay | 165/113 |
| 5,636,317 A | * | 6/1997 | Reznik | 392/312 |
| 5,697,546 A | * | 12/1997 | Cicioni | 228/183 |
| 5,863,580 A | * | 1/1999 | Reznik | 426/237 |
| 6,237,679 B1 | * | 5/2001 | Vestergren | 165/167 |
| 6,415,855 B2 | * | 7/2002 | Gerard et al. | 165/166 |
| 6,448,741 B1 | * | 9/2002 | Inui et al. | 320/107 |
| 6,467,698 B2 | * | 10/2002 | Gaarder et al. | 237/12.3 B |
| 6,910,529 B2 | * | 6/2005 | Stone et al. | 165/299 |
| 7,005,207 B2 | * | 2/2006 | Horiuchi et al. | 429/434 |
| 7,059,394 B2 | * | 6/2006 | Cho et al. | 165/150 |
| 7,189,467 B2 | * | 3/2007 | Wakabayashi et al. | 429/429 |
| 7,241,522 B2 | * | 7/2007 | Moulthrop et al. | 429/411 |
| 7,261,960 B2 | | 8/2007 | Standke et al. | |
| 7,309,538 B2 | * | 12/2007 | Shiraishi et al. | 429/437 |
| 7,399,551 B2 | * | 7/2008 | Yagi et al. | 429/148 |
| 7,638,735 B2 | * | 12/2009 | Petrenko | 219/200 |
| 8,043,757 B2 | * | 10/2011 | Kaye et al. | 429/436 |
| 2004/0005489 A1 | * | 1/2004 | Wakabayashi et al. | 429/24 |
| 2005/0153199 A1 | * | 7/2005 | Yagi et al. | 429/148 |
| 2005/0186455 A1 | * | 8/2005 | Kaye et al. | 429/17 |
| 2006/0257700 A1 | * | 11/2006 | Schrooten et al. | 429/26 |
| 2006/0272340 A1 | * | 12/2006 | Petrenko | 62/73 |
| 2008/0152961 A1 | * | 6/2008 | Zhou et al. | 429/13 |
| 2008/0173637 A1 | * | 7/2008 | Taguchi | 219/523 |
| 2008/0268308 A1 | * | 10/2008 | Schilling et al. | 429/20 |
| 2009/0038785 A1 | * | 2/2009 | Zagalsky | 165/177 |
| 2009/0084129 A1 | * | 4/2009 | Kim et al. | 62/502 |
| 2009/0183936 A1 | * | 7/2009 | Kim et al. | 180/68.4 |
| 2009/0272727 A1 | * | 11/2009 | Han | 219/205 |
| 2010/0275630 A1 | * | 11/2010 | DeMonte et al. | 62/272 |
| 2010/0294474 A1 | * | 11/2010 | Hirota | 165/182 |

FOREIGN PATENT DOCUMENTS

| | | | | |
|---|---|---|---|---|
| JP | 2003156201 A | * | 5/2003 | F22B 21/04 |
| JP | 2004-119299 | | 4/2004 | |
| JP | 2005-044668 | | 2/2005 | |
| KR | 1020050024144 A | | 3/2005 | |
| KR | 1020060024914 A | | 3/2006 | |

* cited by examiner

Fig. 1

(PRIOR ART)

Fig. 2

(PRIOR ART)

Fig. 3

(PRIOR ART)

HEATING DEVICE WITH CATHODE OXYGEN DEPLETION FUNCTION FOR FUEL CELL VEHICLE

CROSS-REFERENCE TO RELATED APPLICATION

This application claims under 35 U.S.C. §119(a) the benefit of Korean Patent Application No. 10-2007-0124727 filed Dec. 4, 2007, the entire contents of which are incorporated herein by reference.

BACKGROUND (a) Technical Field

The present invention relates to a thermal management system (TMS) for a fuel cell vehicle. More particularly, the present invention relates to a heating device with cathode oxygen depletion (COD) function for a fuel cell vehicle, in which an existing COD and a heating device for improving cold startability of the fuel cell vehicle are integrated.

(b) Background Art

Automobile companies have developed hydrogen fuel cell vehicles with keen interest for the purpose of development of environment-friendly vehicles. The hydrogen fuel cell vehicles developed so far have numerous problems to be solved and one of the most important and difficult problems is to provide improved cold startability.

One of the solutions for improving the cold startability of the conventional fuel cell vehicle is rapid thawing of pure water using a heater provided in a rapid thaw accumulator (RTA).

However, if the pure water is used, there are many problems that the pure water is frozen at a temperature below the freezing point, a coolant loop thereof is complicated, and a drain valve is required to be provided additionally.

To solve such problems, there was proposed a method in which an antifreeze solution for the use in a stack is used as a coolant and the coolant is rapidly heated to improve the power generation efficiency of the stack at a temperature below the freezing point.

For this, it is necessary to attach the heater to a coolant line of the stack. Moreover, in order to prevent deterioration of durability of the stack due to corrosion of catalyst-loaded carbon during start-up and shut-down of the fuel cell vehicle, a COD is connected to both terminals of the stack so that the electric energy generated by a chemical reaction between hydrogen and oxygen is consumed to generate heat energy.

Figure 1:
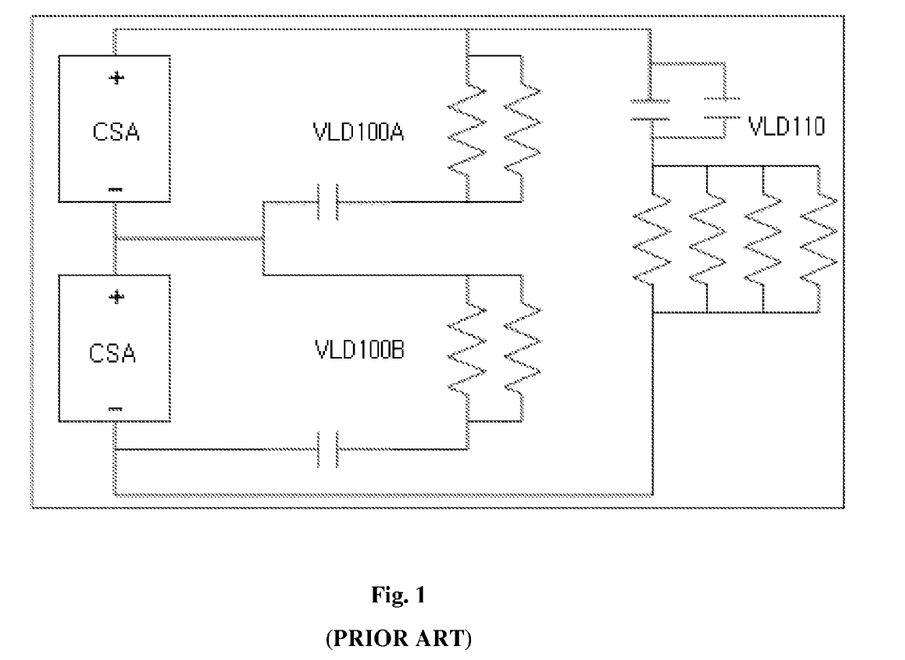
FIG. 1 is a diagram illustrating the operation principle of a conventional COD.

FIG. 1 is a diagram illustrating the operation principle of the conventional COD, in which VLD100A and VLD100B are start-up CODs, and VLD110 is a shut-down COD. The VLD100A and VLD100B are connected to an end of a stack module via a relay and a fuse, and the VLD110 is connected to ends of two stack modules via two relays and two fuses.

Upon start-up of the vehicle, the VLD100A and VLD100B are connected to the stack to cause a reaction between hydrogen remaining in the stack and oxygen to generate heat and, during shut-down of the vehicle, the VLD110 is connected to the stack to remove the hydrogen remaining in the stack.

Especially, during shut-down, the engine is completely turned off by a normally close (N/C) relay (not shown) attached thereto, and the shut-down COD is always connected to both ends of the stack even in the case where the vehicle is stopped.

However, conventionally, there has been no heater developed specially for the purpose of heating the stack coolant to improve the power generation efficiency of the stack at a temperature below the freezing point after start-up of the vehicle. Moreover, the conventional COD is not used as a heater but used as a device for ensuring durability of the stack by generating heat using the hydrogen remaining in the stack and oxygen during start-up or shut-down of the vehicle.

Accordingly, in addition to the above COD, it is required to provide a heater for rapidly heating the coolant in order to improve the power generation efficiency of the stack at a temperature below the freezing point after start-up of the vehicle. However, in a case where the heater for heating the coolant is provided separately from the COD, there are drawbacks that the manufacturing cost of the vehicle is increased and it is difficult to ensure a layout space.

Figure 2:
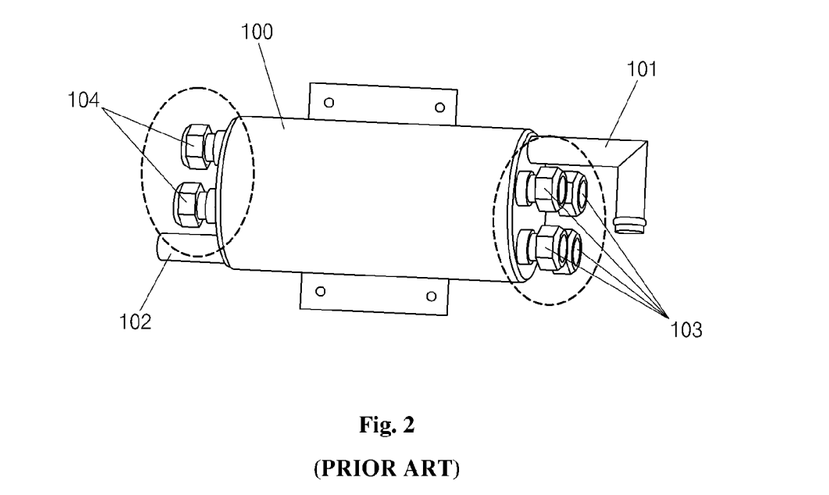
FIG. 2 is a schematic diagram showing the shape of the conventional COD.

Meanwhile, as shown in FIG. 2, start-up CODs 103 and shut-down CODs 104 are provided at both ends of a cylindrical housing 100, and a coolant inlet 101 and an outlet 102 are formed at both ends of the housing 100. Since the cylindrical housing 100 has an inner diameter greater than that of the coolant inlet 101 and the outlet 102, the coolant passes through sudden expansion and sudden contraction pipes while flowing from the coolant inlet 101 to the outlet 102, and thus there is a significant pressure drop, which results in a heavy load being applied to a pump.

Moreover, the conventional COD has a drawback in that since it is attached to the front coolant line, it is impossible to perform maintenance and repair without using a lift. And, since the heater may be exposed to the air, the heat generated from the heater may be lost.

To solve the above problems, the inventors of the present invention proposed a heater with a COD function for a fuel cell vehicle as is disclosed in Korean Patent Application No. 10-2007-0105369, in which a heater for improving cold startability of the fuel cell vehicle and an existing COD function for ensuring durability of a fuel cell stack are integrated so as to reduce the manufacturing cost of the vehicle, ensure a layout space, improve maintenance efficiency, and improve the cold startability through a multistage current control.

Figure 3:
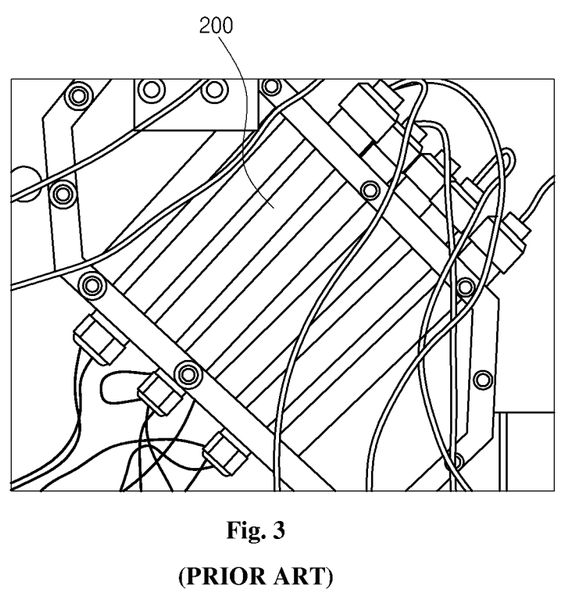
FIG. 3 is a diagram showing that bubbles are formed on a conventional heater with a COD function for a fuel cell vehicle.

However, since a cartridge heater provided inside a housing of the above heater, in which the heater for improving the cold startability of the fuel cell vehicle and the existing COD function are integrated, has a calorific value of about 3.2 kW per unit, a high heat density, bubbles are uniformly formed on the overall heater surface when the flux of the coolant is 0 LPM, as shown in FIG. 3.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. One of the objects of the present invention is to provide a heating device with COD function for a fuel cell vehicle, which can prevent bubble formation on the surface of the heaters constituting the heating device and can improve the heat transfer performance.

In one aspect, the present invention provides a heating device with COD function for a fuel cell vehicle, the heater comprising: a housing having an inlet and an outlet formed on both ends thereof; a start-up heater and a shut-down heater provided in parallel on one side of the housing in a direction perpendicular to a coolant flow direction; and a plurality of heaters for heating coolant provided in parallel on the other side of the housing in a direction perpendicular to the coolant flow direction, wherein cross sections in the coolant flow direction of each of the respective heaters change periodically along the longitudinal direction of the heater so as to cause a flow disturbance.

Preferably, each of the respective heaters may have a plurality of projections and a plurality of concave grooves formed alternately in the longitudinal direction of the heater.

Also preferably, each of the cross sections may have a shape selected from the group consisting of a triangle, a square, a circle, a sine wave shape, a spiral shape, and a combination thereof.

Suitably, the heaters may be arranged in a row along the coolant flow direction such that the projections and the concave grooves thereof be arranged alternately in the coolant flow direction.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Reference numerals set forth in the Drawings includes reference to the following elements as further discussed below:

10, 20: heater 11: housing

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 4:
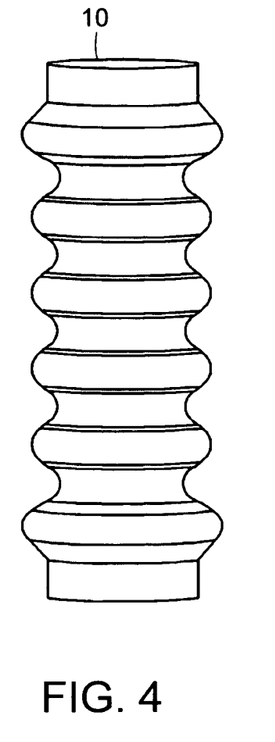
FIG. 4 is a diagram showing the shape of a heater in accordance with a preferred embodiment of the present invention.
Figure 5:
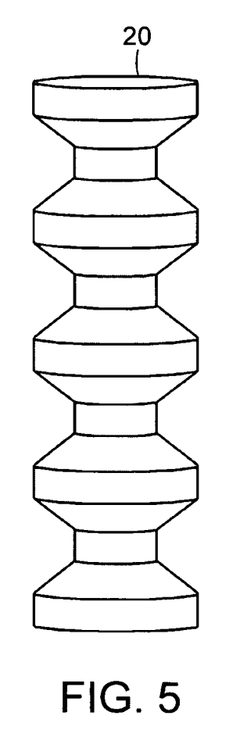
FIG. 5 is a diagram showing the shape of a heater in accordance with another preferred embodiment of the present invention.

FIG. 4 is a diagram showing the shape of a heater in accordance with a preferred embodiment of the present invention, and FIG. 5 is a diagram showing the shape of a heater in accordance with another preferred embodiment of the present invention.

A heating device with COD function for a fuel cell vehicle in accordance with the present invention includes a housing 11 having an inlet and an outlet formed on both ends thereof, a start-up heater and a shut-down heater provided in parallel on one side of the housing 11 in a direction perpendicular to the coolant flow direction, and a plurality of heaters for heating coolant provided in parallel on the other side of the housing 11 in a direction perpendicular to the coolant flow direction. The start-up heater and the shut-down heater generate heat using hydrogen remaining in the stack to prevent deterioration of durability of the stack, and the heaters for heating coolant rapidly heat the coolant to improve cold startability of the fuel cell vehicle even at a temperature below the freezing point. The start-up heater, the shut-down heater, and the heaters for heating coolant are integrated in a single housing 11.

Here, the present invention aims at changing the shape(s) of the heater(s) 10 to prevent bubbles from forming on the surface of the heater(s) 10.

The flow direction of the coolant introduced through the inlet of the housing and discharged through the outlet via the inside of the housing 11 is perpendicular to the longitudinal direction of the heater 10.

The cross section of the coolant flow direction in the heater 10 in accordance with the present invention varies periodically along the longitudinal direction of the heater 10.

For example, as shown in FIG. 4, the circular section of the inside of the heater 10 may be designed so as to follow a sine wave along the longitudinal direction of the heater 10. The circular section becomes larger and smaller periodically, following the sine wave, and the circular section is increased and decreased entirely in the radial direction.

The exterior of the heater 10 has a structure in which a plurality of projections and a plurality of concave grooves are formed periodically in the longitudinal direction thereof.

In the heater 10 having a cylindrical shape, of which the cross section is changed in the longitudinal direction, the shapes of the cross sections of the projections and the concave grooves are the same as each other as a circular shape, but their sizes are different.

In the above cylinder, of which the outer surface in the longitudinal direction has a sine wave shape, a swirl flow is formed much longer in the rear of the cylinder compared with a cylinder, of which the outer surface in the longitudinal direction has a straight line shape, thus providing an effect of significantly reducing drag force.

As a result, it is possible to decrease the surface temperature of the heater 10 by an effect of disturbing the flow due to the change in the cross section as well as an effect of reducing the differential pressure between the front and rear ends of the cylinder, thus preventing bubbles from forming.

If the cylinders, of which the outer surface in the longitudinal direction has a straight line shape, are arranged in a row, the region where the bubbles are formed is increased as it goes toward the coolant outlet due to a screen effect that the front heater 200 blocks the rear heater 200 FIG. 3).

Figure 6A:
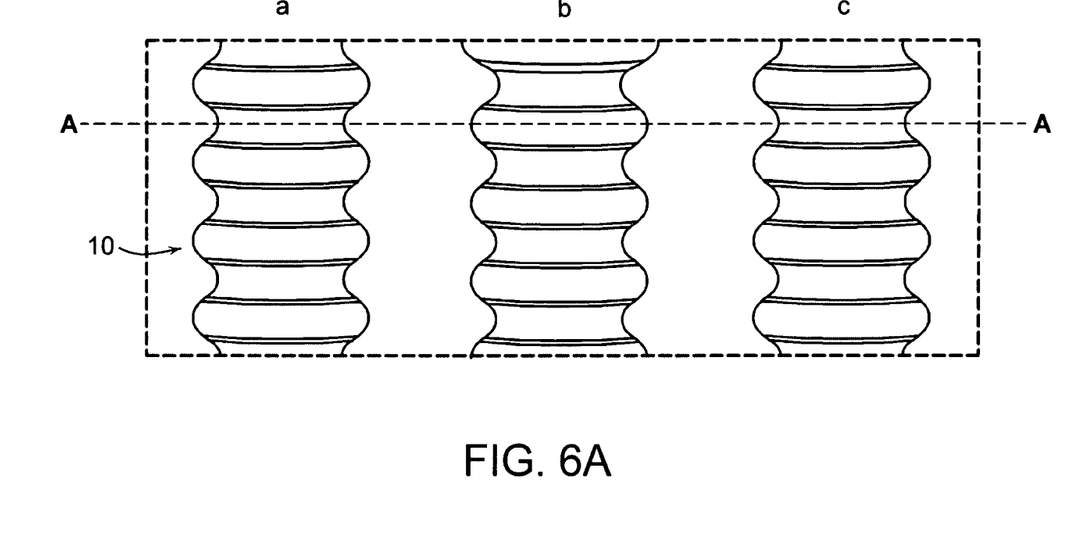
FIGS. 6A and 6B are diagrams illustrating a method of arranging the heaters of FIG. 4.
Figure 6B:
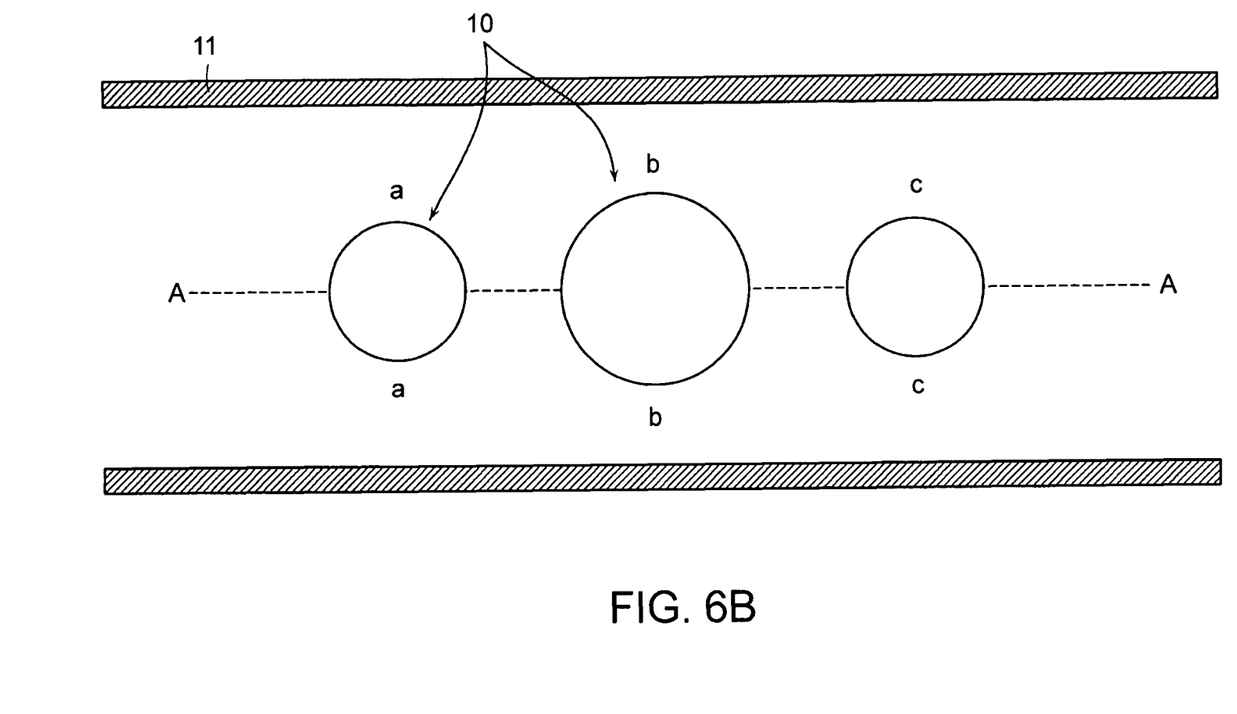

FIGS. 6A and 6B are diagrams illustrating a method of arranging the heaters of FIG. 4.

As shown in FIGS. 6A and 6B, if the heaters 10 are arranged in a row and the shapes of the cross sections of the heaters 10 changes periodically in the flow direction of the fluid (i.e., A-A line), the heat transfer effect is increased by the disturbance of the flow, and it is possible to prevent bubbles from forming due to a drop in the surface temperature of the heater 10.

Referring to FIG. 6A, in regions a and c, which are concave groove sections, the fluid velocity is lower. On the other hand, in region b, which is a projecting section, the fluid velocity is higher.

Figure 7:
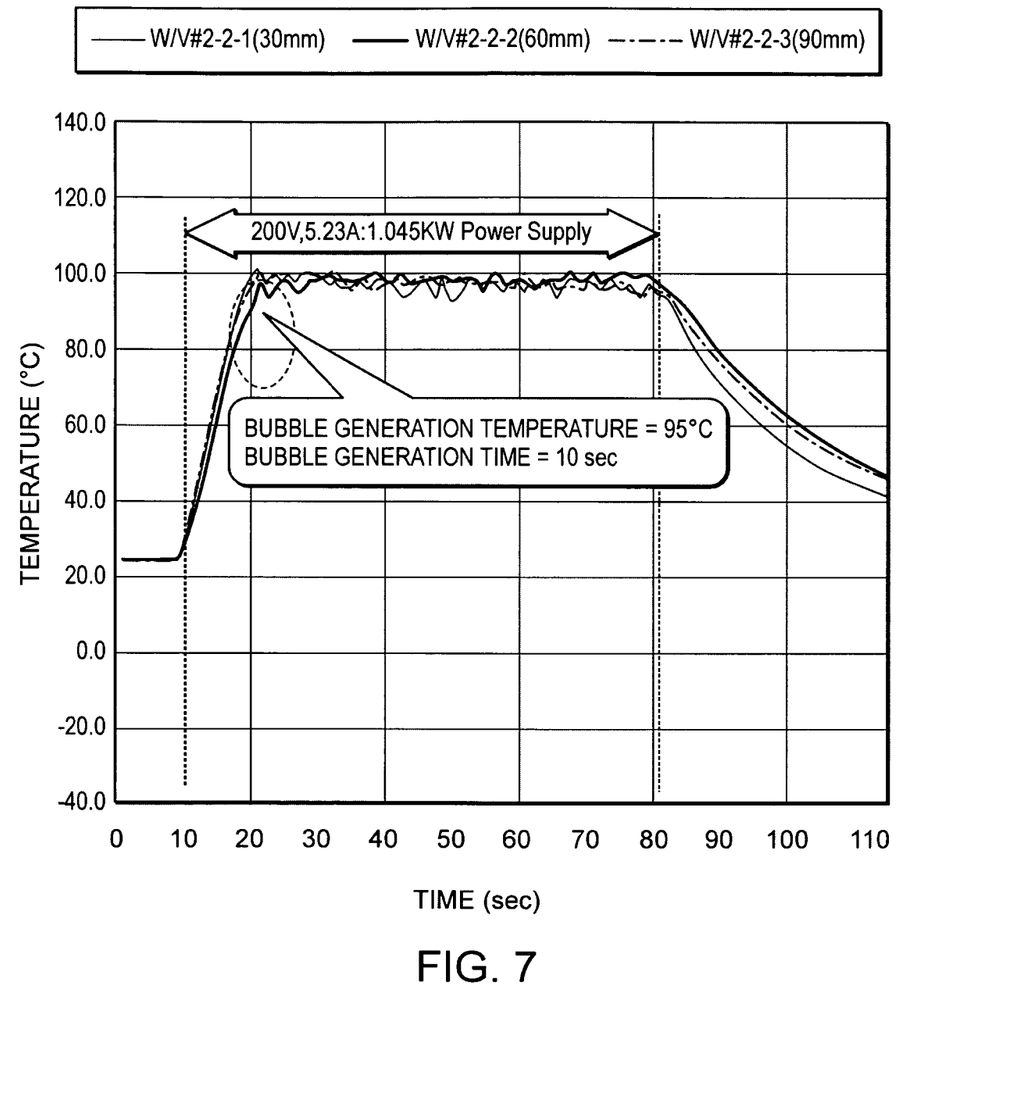
FIG. 7 is a graph showing the results of measurement of surface temperature at which bubbles start to form on the heater surface.
Figure 8:
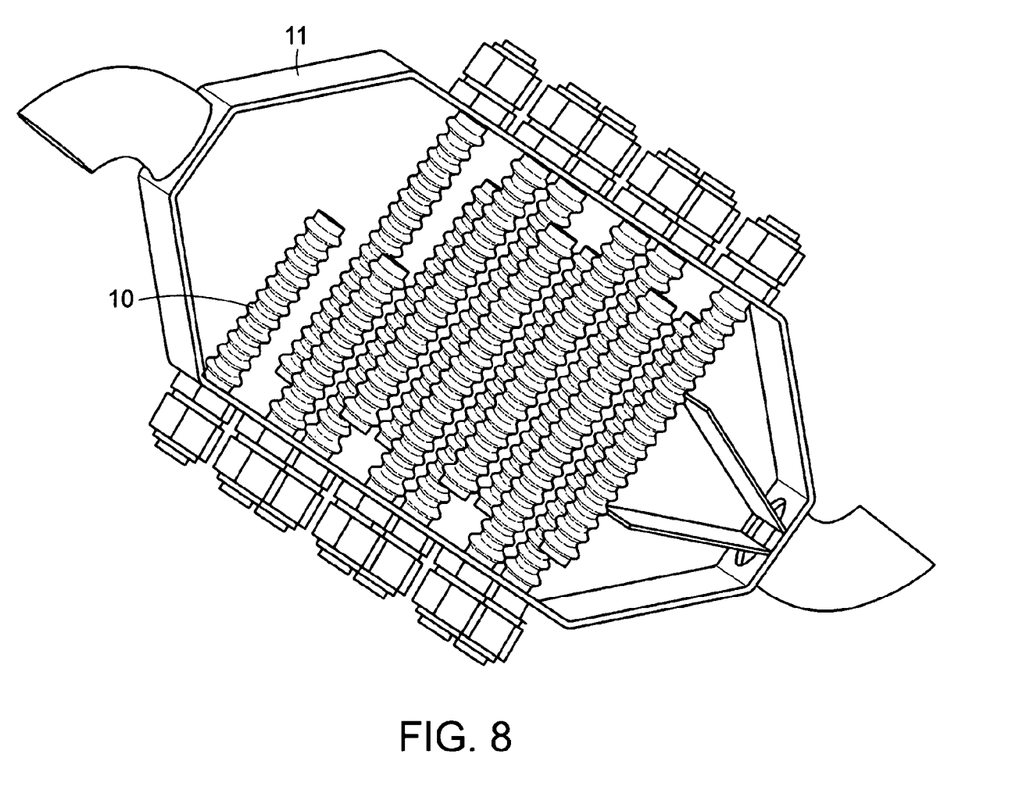
FIG. 8 is a diagram showing a heating with a COD function in accordance with a preferred embodiment of the present invention.

FIG. 7 is a graph showing the results of measurement of surface temperature at which bubbles start to form on the heater surface by applying an electric power of 200V/5.23 A to one of the heaters for heating coolant.

As shown in FIG. 7, since the conventional heater 200 having a uniform circular section has a very high heat density, if the surface temperature reaches around 100° C., bubbles start to form. Unlike the heater 200, the heater 10 having a sine wave shape has an increased heating surface area and provide the effect of disturbing the flow, which prevents bubble formation.

Moreover, in the case where the conventional heaters 200 are arranged in a row, if the flux is increased, a flow induced vibration may occur, vibrating the heaters. By contrast, if the heaters 10 with a modified shape are arranged so as to have a phase difference of 90° as shown in FIG. 6A, it is possible to significantly reduce the flow induced vibration.

Preferably, it is possible to manufacture an optimized sine-wave-shaped cylinder by adjusting the distance between an end of a projection and an end of adjacent projection in the above sine-wave-shaped cylinder.

Although the cylindrical heater 10 having a sine wave shape has been described as an example, the outer surface in the longitudinal direction of the heater 10 is not limited to the sine wave shape. Rather, for instance, a spiral groove may be formed or the projection may have a cross section selected from the group consisting of a triangle, a square, a circle, and a combination thereof. For example, the heater 20 shown in FIG. 5 may be used in the present invention.

Also preferably, in addition to the structure in which the shape of the cross section of the heater is modified as described above, a plurality of cooling fins may be attached to the heater surface at regular intervals, and the height, interval and/or shape of the fins may further be modified.

As described above, according to the heating device with the COD function for a fuel cell vehicle of the present invention, it is possible to improve the heat transfer performance and prevent the flow induced vibration and bubbles from being forming by modifying the shape of the heater and varying the arrangement of the heaters according to the shape of the heater.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A heating device comprising:
a housing including:
an inlet formed on one surface of the housing and an outlet formed on an opposite surface of the housing, wherein a coolant flows freely through the housing from the inlet to the outlet, and;
a start-up heater and a shut-down heater within the housing and provided in parallel on one side of the housing in a direction perpendicular to a coolant flow direction; and
a plurality of heaters within the housing configured to heat coolant provided in parallel on the other side of the housing in a direction perpendicular to the coolant flow direction, each heater being tubular in shape,
wherein cross sections in the coolant flow direction of each of the respective heaters change periodically along the longitudinal direction of the heater so as to cause a flow disturbance, and the width of the cross sections is periodically increased and decreased along an inside surface and an outside surface of each tubular heater to form an irregular flow path along the inside of each of the plurality of heaters within the housing, and
wherein the heaters are arranged in an alternating pattern in parallel in the housing, and the heaters are arranged to have a phase difference of 90° in a radial direction in relation to the width of each cross section of the heater, and
wherein the heating device is configured to provide a cathode oxygen depletion (COD) function for a fuel cell vehicle.

2. The heating device of claim 1, wherein each of the respective heaters has a plurality of projections and a plurality of concave grooves formed alternately in the longitudinal direction of the heater.

3. The heating device of claim 1, wherein each of the cross sections has a shape selected from the group consisting of a triangle, a square, a circle, a sine wave shape, a spiral shape, and a combination thereof.

4. The heating device of claim 1, wherein the cross section has a sinusoidal shape.

* * * * *